United States Patent [19]

Schiller et al.

[11] 4,247,899

[45] Jan. 27, 1981

[54] FUEL DELIVERY CONTROL AND REGISTRATION SYSTEM

[75] Inventors: Robert J. Schiller, Simsbury; Neal M. Alderman, Manchester, both of Conn.

[73] Assignee: Veeder Industries Inc., Hartford, Conn.

[21] Appl. No.: 2,310

[22] Filed: Jan. 10, 1979

[51] Int. Cl.³ .......................... G06F 15/56; B67D 3/00

[52] U.S. Cl. .......................... 364/465; 364/510; 364/479; 235/92 FL; 222/26

[58] Field of Search .............. 364/465, 479, 510, 900; 235/92 FL; 222/23-28, 36, 76

[56] References Cited

U.S. PATENT DOCUMENTS

| | | | |
|---|---|---|---|
| 3,765,567 | 10/1973 | Maiocco et al. | 222/76 |
| 3,847,302 | 11/1974 | Krone et al. | 222/28 |
| 3,894,658 | 7/1975 | Buell, Jr. | 364/465 |
| 3,895,738 | 7/1975 | Buchanan et al. | 364/465 |
| 3,899,775 | 8/1975 | Larsen | 364/900 |
| 3,927,800 | 12/1975 | Zinsmeyer et al. | 235/92 FL |
| 3,949,207 | 4/1976 | Savary et al. | 364/465 |
| 3,984,032 | 10/1976 | Hyde et al. | 364/479 |
| 4,034,193 | 7/1977 | Jackson | 222/36 |
| 4,074,356 | 2/1978 | Schiller et al. | 364/465 |
| 4,087,858 | 5/1978 | Pichler et al. | 364/465 |
| 4,107,777 | 8/1978 | Pearson et al. | 364/465 |

*Primary Examiner*—Charles E. Atkinson
*Assistant Examiner*—Gary Chin
*Attorney, Agent, or Firm*—Prutzman, Kalb, Chilton & Alix

[57] ABSTRACT

A self-service gasoline station fuel delivery control and registration system having a central control unit with a display console, operating keyboard and master microprocessor module; separate slave microprocessor modules for the gasoline pumps for separately controlling the pumps and accumulating the amount of gasoline delivered thereby and connected for sequential communication with the master microprocessor module by common slave bus means; and peripheral controllers connected for selective communication with the master microprocessor module by common peripheral bus means for operating the system and/or registering the amount of gasoline delivered.

11 Claims, 3 Drawing Figures

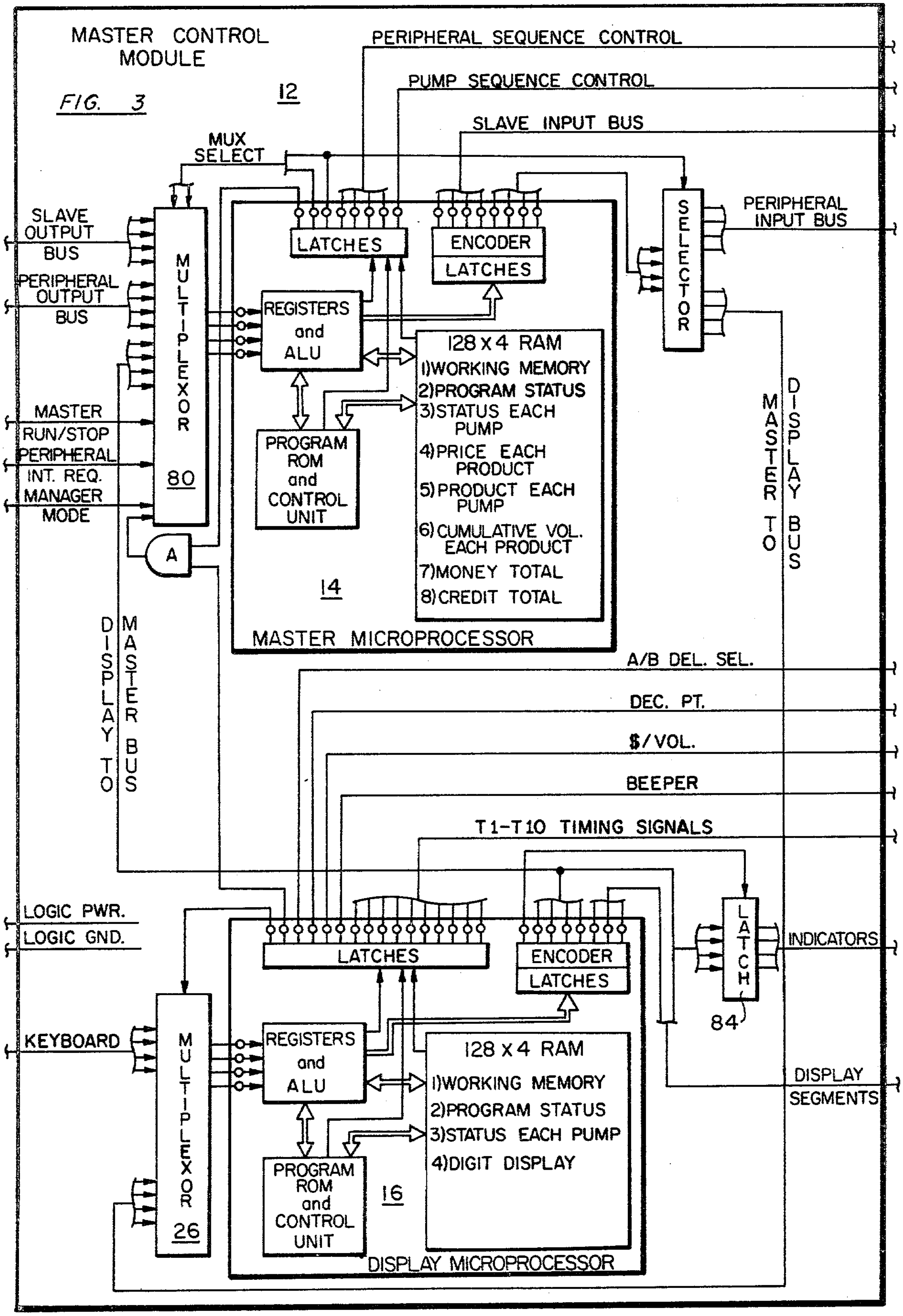
MASTER CONTROL MODULE
FIG. 3
12
PERIPHERAL SEQUENCE CONTROL
PUMP SEQUENCE CONTROL
SLAVE INPUT BUS
MUX SELECT
SLAVE OUTPUT BUS
PERIPHERAL OUTPUT BUS
MULTIPLEXOR
80
MASTER RUN/STOP
PERIPHERAL INT. REQ.
MANAGER MODE
LATCHES
ENCODER
LATCHES
REGISTERS and ALU
PROGRAM ROM and CONTROL UNIT
128 x 4 RAM
1)WORKING MEMORY
2)PROGRAM STATUS
3)STATUS EACH PUMP
4)PRICE EACH PRODUCT
5)PRODUCT EACH PUMP
6)CUMULATIVE VOL. EACH PRODUCT
7)MONEY TOTAL
8)CREDIT TOTAL
14
MASTER MICROPROCESSOR
A
SELECTOR
PERIPHERAL INPUT BUS
MASTER TO DISPLAY BUS
DISPLAY TO MASTER BUS
A/B DEL. SEL.
DEC. PT.
$/VOL.
BEEPER
T1-T10 TIMING SIGNALS
LOGIC PWR.
LOGIC GND.
KEYBOARD
MULTIPLEXOR
26
LATCHES
ENCODER
LATCHES
REGISTERS and ALU
PROGRAM ROM and CONTROL UNIT
16
128 x 4 RAM
1)WORKING MEMORY
2)PROGRAM STATUS
3)STATUS EACH PUMP
4)DIGIT DISPLAY
DISPLAY MICROPROCESSOR
LATCH
84
INDICATORS
DISPLAY SEGMENTS

FUEL DELIVERY CONTROL AND REGISTRATION SYSTEM

BRIEF SUMMARY OF THE INVENTION

The present invention relates to fuel delivery control and registration systems having notable utility for individually controlling and reigstering fuel deliveries at each of a plurality of self-service fuel dispensers.

It is a primary aim of the present invention to provide a new and improved fuel delivery control and registration system for individual controlling self-service deliveries of fuel from a plurality of self-service fuel dispensers and charging each self-service customer for fuel he delivered.

It is another aim of the present invention to provide a new and improved fuel station delivery control and registration system having a modular design facilitating custom adaptation of the system to any desired number of fuel dispensers within its design capacity.

It is a further aim of the present invention to provide a new and improved fuel station delivery control and registration system having a central control station for selectively registering station fuel delivery data for accounting purposes.

It is another aim of the present invention to provide a new and improved fuel delivery control and registration system which employs a master computer module and individual slave computer modules for the fuel dispensers and connected for sequentially communicating with the master computer module via a common data link and such that any desired number of dispenser slave modules can be employed within the available capacity of the equipment through relatively simple connection of each dispenser slave module to the common data link and to a slave module sequencing circuit.

It is another aim of the present invention to provide a new and improved self-service fuel station delivery control and registration system operable for establishing either a preset or non-preset mode of operation for each self-service delivery of fuel.

It is a further aim of the present invention to provide a new and improved self-service fuel station delivery control and registration system for remotely controlling and registering the cost and volume amounts of each fuel delivery at the fuel station.

It is another aim of the present invention to provide a new and improved fuel station delivery control and registration system operable for controlling and registering self-service and/or attendant operated fuel deliveries from a large number of fuel dispensers.

It is a further aim of the present invention to provide a new and improved fuel station delivery registration system operable for selectively displaying (a) the cost and volume amounts of each of a plurality of individual fuel deliveries from each of a plurality of fuel dispensers; (b) the cumulative volume amount delivered of each of a plurality of fuel products or grades available at the fuel station; (c) the cumulative volume and cost amounts delivered by each fuel dispenser and the total volume and cost amounts delivered by each dispenser during a shift or any other desired period; and (d) the cumulative cost and credit deliveries at the fuel station.

It is another aim of the present invention to provide a new and improved self-service fuel station delivery control and registration system which provides central control and registration of each fuel delivery at a central pay station and also remote registration and/or control, for example, at a remote print-out station and/or at a remote computer station connected to a large number of fuel stations.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 3 is a generally diagrammatic view, partly broken away, of a central station unit of the fuel delivery control and registration system.

DESCRIPTION OF THE PREFERRED EMBODIMENT

Figure 1:
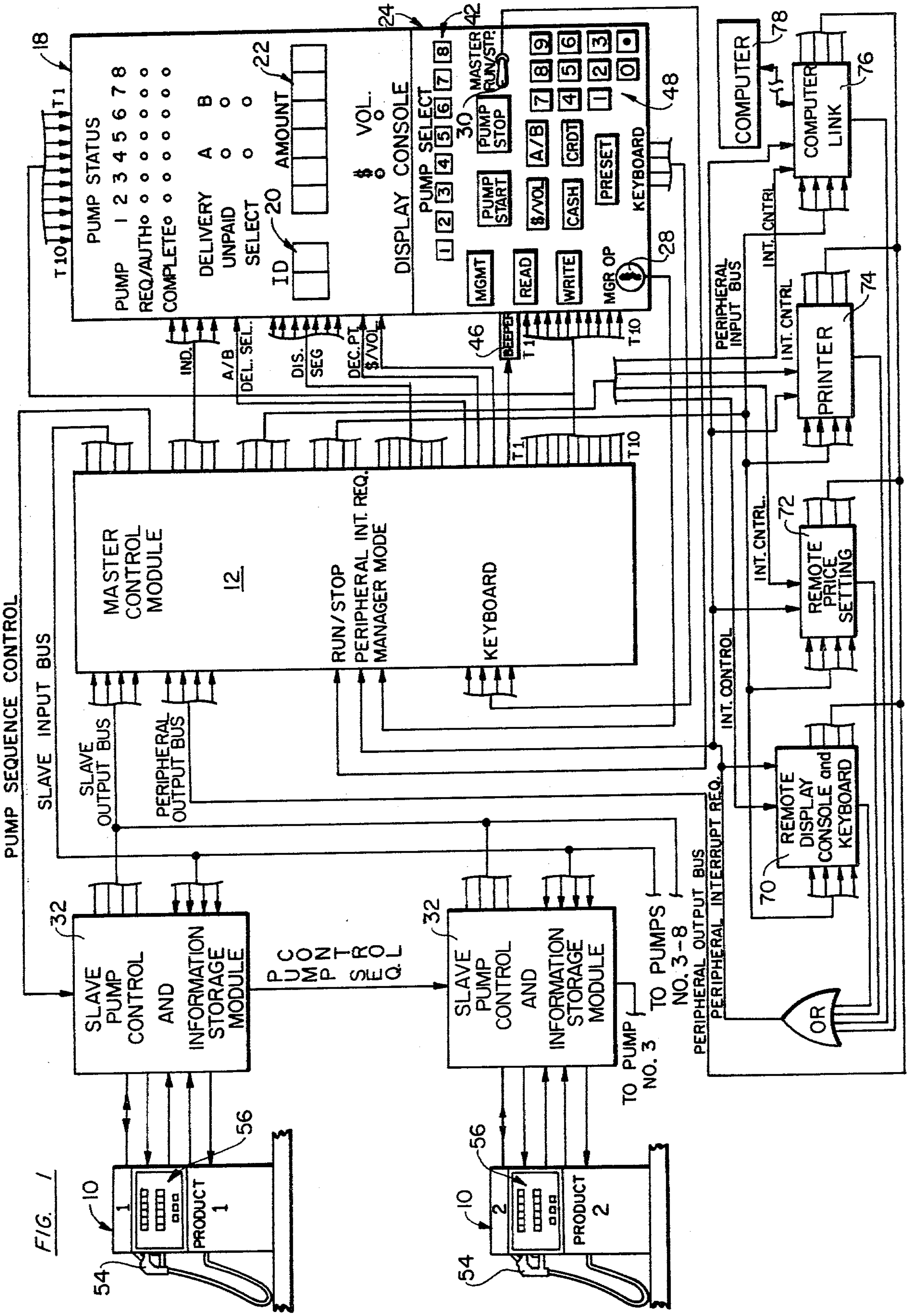
FIG. 1 is a generally diagrammatic view, partly broken away, of a gasoline station employing an embodiment of fuel delivery control and registration system of the present invention.
Figure 2:
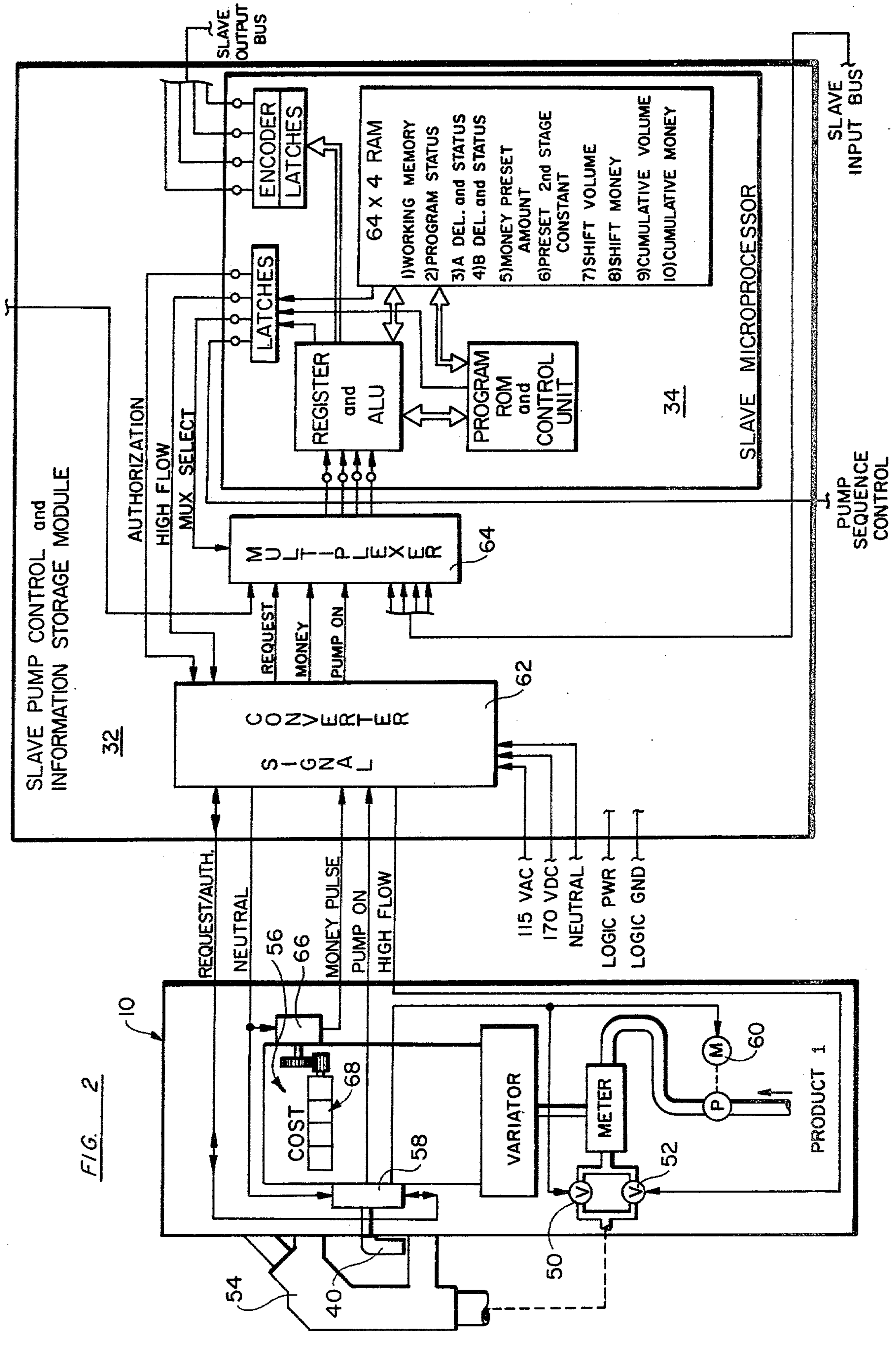
FIG. 2 is a generally diagrammatic view, partly broken away, showing a gasoline pump or dispenser and a respective slave control and information storage module of the fuel delivery control and registration system.

Referring now to the drawings in detail, wherein like numerals represent like parts, the shown embodiment 8 of a fuel delivery control and registration system incorporating the present invention is adapted to be used with eight generally conventional self-service pumps or dispensers 10 of which only two are shown in FIG. 1.

The delivery control and registration system 8 comprises a master pump control and information storage module 12 with master and display microprocessors 14, 16 (each having a $128\times4$ storage RAM) and a display console 18 with a plurality of LED indicators, a two-digit identification register 20 and a six-digit cost/volume register 22. A keyboard 24 is connected to the display microprocessor 16 (via an input multiplexor 26) and to the master microprocessor 14 via a display-to-master output bus of the display microprocessor. The keyboard 24 has a plurality of manually operable push button switches hereinafter described, a two position key lock switch 28, and a two position MASTER RUN/STP switch 30 which in the STOP mode functions to deactivate all of the pumps 10 (for example, for temporarily discontinuing all fuel deliveries in process for emergency reasons) and which in the RUN mode functions to activate the system to permit individual activation or reactivation of each pump.

A slave pump control and information storage module 32 is provided for each dispenser 10. Each slave module 32 has a slave microprocessor 34 with a $64\times4$ storage RAM having A and B register sections for separately accumulating and storing (a) the cost amount of each of two separate A and B fuel deliveries by the respective dispenser; and (b) the existing status of each A and B delivery (i.e. delivery authorized, on, completed and unpaid, or completed and paid). The master microprocessor 14 selects a register section for each delivery when the dispenser is authorized to deliver fuel and selects the A register unless a prior delivery stored in the A register has not yet been marked paid by pressing either a CASH or CREDIT push button as hereinafter described, in which case the B register is used unless a prior delivery stored in that register has also not been marked paid. If both registers hold unpaid transactions, the dispenser can not be authorized until at least one of those transactions is marked paid.

Each slave microprocessor RAM also stores (a) the cumulative cost and volume amounts of fuel delivered by the respective pump; (b) the total cost and volume amounts of fuel delivered by the respective pump, for example, during an eight hour shift; (c) any preset cost amount entered via the keyboard 24 for automatically terminating a preset fuel delivery when a dispenser 10 is operated in a preset mode as hereinafter described; (d) any second stage cost constant entered via the keyboard 24 and which, in the preset mode of operation of the dispenser, establishes the terminal cost amount of fuel dispensed at a low flow rate; (e) the established preset or non-preset mode of operation of the pump (stored in the RAM working memory); and (f) the established local control (for attendant or manual operation) or remote control (for self-service operation) mode of operation of the pump (stored in the RAM working memory).

The six-digit cost/volume register 22 is operable by the keyboard 24 to selectively display (a) the cost amount of each A and B fuel delivery of each dispenser (stored in the respective slave microprocessor) and the corresponding volume amount of each delivery (which is computed by the master microprocessor from the cost amount stored in the slave and a unit volume price for the respective fuel product stored in the master); (b) the cumulative volume amount (stored in the master) of each of up to four available products or grades of fuel; (c) the cumulative cost and volume amounts of fuel delivered by each pump (stored in the respective slave); (d) the total cost and volume amounts delivered by each pump during a shift or other desired time period (stored in the respective slave); (e) the cumulative cost and credit amounts delivered by all of the pumps (stored in the master); (f) the established preset cost amount of each pump (stored in the respective slave); (g) the established preset second stage constant (stored in all of the slaves); (h) the established unit volume price for each product (stored in the master); and (i) the designated product for each pump.

The display console 18, keyboard 24, and the master control module 12 are preferably provided as a single central station package or unit which may be conveniently located at a suitable central pay station to permit a central station operator to view a dispensing operation at each dispenser 10 as well as to control and register each delivery. Thus, although the system can be operated to place any or all of the pumps 10 in a local mode of operation for manual or local control with their pump control handles 40 in a conventional manner, the central station control has primary utility in its remote mode of operation for providing remote control for self-service delivery of gasoline from each self-service dispenser 10 and such that each self-service customer can handle his own gasoline delivery after appropriate authorization is given by the central station operator. Also, in the remote control mode, the pumps 10 can be individually set for either a preset or a non-preset mode of operation. When a pump 10 is operating in the preset mode, the control system provides for automatically terminating a fuel delivery after the delivery of a preset amount previously entered via the keyboard 24 into the RAM of the respective slave.

The keyboard push button switches comprise a bank 42 of eight pump selector buttons for individually selecting the eight dispensers 10. When a pump selector button is pressed, the selected pump is displayed by the two-digit identification register 20, and the six-digit cost/volume register 22 displays the cost amount of gasoline dispensed by the selected dispenser. The cost amount is automatically displayed, and a $/VOL push button is operable to switch the display to the corresponding volume amount (calculated by the master microprocessor 14) or back to the cost amount. Cost ($) and volume (VOL) indicators are alternatively energized to show which amount is being displayed. Also, where only one unpaid transaction is stored in the slave, that transaction is automatically displayed; where two unpaid transactions are stored in the slave the earlier unpaid transaction is automatically displayed, and where there are no unpaid transactions stored in the slave, the A register amount is automatically displayed. The operator can switch the display to the other transaction by pressing an A/B push button. If a pump delivery is selected while in process the running amount is displayed. A and B delivery indicators are alternatively energized to indicate which delivery of the selected pump is displayed, and A and B delivery UNPAID indicators are individually energized to indicate that the respective delivery of the selected pump has been completed (by turning the respective pump control handle 40 off) and has not yet been marked paid (by actuating either a CASH push button when a cash sale is made or a CREDIT push button when a credit sale is made when that delivery is displayed by the cost/volume register 22).

An authorization or PUMP START push button is operable for authorizing the selected pump, and a respective REQ/AUTH indicator of a bank of eight authorization indicators is energized continuously when the corresponding pump is authorized. If a pump is not authorized, its authorization indicator is energized intermittently and a beeper 46 is energized to sound intermittently when the pump control handle 40 is rotated to a horizontal or on position (which also turns the pump on for delivering fuel when the pump is authorized). When a pump is turned off at the end of a fuel delivery by rotating the pump control handle 40 to its vertical or off position, the REQ/AUTH indicator is de-energized, the beeper 46 is energized to sound a short beep, and a COMPLETE indicator is energized. The COMPLETE indicator remains energized as long as any completed delivery for that pump remains unpaid.

If the MASTER switch 30 is switched to its STOP position, each authorized pump is de-authorized or deactivated without change in the display except that the respective REQ/AUTH indicator will be energized intermittently. A PUMP STOP button is similarly operable to de-authorize or deactivate the selected pump only. In either case, any such de-authorized pump can be reauthorized (when the MASTER switch is in its START position), by successively actuating the corresponding pump select button and PUMP START button.

In a preset or prepay mode of operation, a preset amount is entered via a number keyboard section 48 having 0-9 and decimal point push buttons. The preset amount is automatically entered (and is simultaneously displayed by the six-digit cost/volume register 22) in dollars (to two decimal places) unless the $/VOL push button is actuated first, in which case the preset amount is entered in gallons (to three decimal places). The preset amount is identified with the $ and VOL indicators.

If a volume preset amount is entered, the master microprocessor 14 computes the corresponding cost amount (based on the unit volume price stored in the master for the product dispensed by the selected pump) which will then be stored in the slave microprocessor 32 of the selected pump. The preset authorization procedure comprises in sequence actuating the desired pump select button, actuating the PRESET button (whereupon the prior preset cost amount for the selected pump is displayed by the cost/volume register 22), actuating the $/VOL button if a volume preset is desired (whereupon a calculated preset volume amount corresponding to the preset cost amount is displayed), entering the desired volume or cost amount with the numeral keyboard section 48 (if the prior preset amount is to be changed), and then actuating the PUMP START button. The selected pump is then authorized to deliver the preset amount of fuel. In the preset mode, a two stage pump shut-off valve having a low flow valve 50 and a high flow valve 52 is employed for automatically terminating the delivery after the preset amount is delivered. The high flow or first stage valve 52 is closed (i.e. de-energized) at a preestablished cost amount (i.e. the preset second stage constant previously stored in the slave) before the preset amount is reached. The low flow or second stage valve 50 is closed (i.e. de-energized) when the exact preset amount is reached.

The keyboard key lock 28 has manager and operator positions. In the operator position, the keyboard is operable for establishing either a local or remote control mode of operation for each pump, and in the remote control mode of operation, for authorizing each pump in either a preset or non-preset mode of operation. Also, in the operator mode, the keyboard is selectively operable to display (a) each of the various cost and volume amounts stored in the master and slave microprocessors and the corresponding cost or volume amount calculated by the master microprocessor; (b) the unit volume price for each available product; and (c) the designated product for each pump. In the manager mode, in addition to those functions which may be performed in the operator mode, each of the various total and cumulative amounts stored in the master and in each slave, the preset second stage constant (stored in all of the slaves), and the unit volume price for each product and the product designation for each pump (stored in the master) can be revised or reset to zero.

Three keyboard push buttons entitled MGMT (for management), READ, and WRITE are used with the number keyboard section 48 for selectively displaying and revising if desired (in the manager mode only) the various data stored in the slave and master microprocessors (except the individual A and B fuel deliveries stored in each slave), and also for selecting either local or remote control of each pump.

The procedure begins by pushing the MGMT push button which clears the identification register 20 and cost/volume register 22. Then a two-digit function code (which is preestablished for each data select and control function) is entered via the number keyboard 48 and displayed by the identification register 20. An individual pump or product number is then entered with the number keyboard 48 as required when using certain function codes, and the pump or product number is then displayed by the identification register 20 in place of the two-digit function code. The READ push button is then pressed to display the selected amount or perform the selected control function. The cost amount is displayed unless the $/GAL button is pressed before the READ button. If a revised amount is desired, the revised amount is entered by the number keyboard 48 and displayed by the cost/volume register 22. number keyboard 48 and displayed by the cost/volume register 22. Then the WRITE push button is actuated to enter the new amount in place of the previously read amount. To reset the previous amount to zero, it is merely necessary to press the zero push button once before pressing the WRITE button. The management mode may be exited at any time by pressing any pump select button. In the foregoing manner, the total cumulated cost amount of fuel delivered by each pump or cost amount delivered by each pump during an established period or shift, the cumulative volume amount delivered of each product and cumulative cost and credit amounts delivered of all products can be displayed (and also revised if desired, when operating in the manager mode). The corresponding cost or volume amount can be displayed by depressing the $/VOL push button switch. In similar fashion the second stage valve knock-off constant for preset fuel deliveries can be displayed and revised.

The three fuel delivery modes are non-preset, preset and local control mode. In the non-preset mode, the customer first removes the fuel delivery nozzle 54 and turns the pump control handle 40 on. If the pump has already been authorized, the customer can dispense product. If not, the pump REQ/AUTH indicator will operate intermittently and the beeper 46 will beep intermittently. The central station operator can then authorize the pump by actuating the appropriate pump select button and then the PUMP START button. The local pump register 56 will then be automatically reset with a conventional pump reset mechanism 58, and the amount of the prior delivery stored in the RAM delivery register is cleared when a pump on signal is supplied by the pump 10 at the end of the pump reset cycle. Also, a pump motor 60 and the second stage or low flow valve 50 are automatically energized at the end of the reset cycle, and the high flow valve 52 is automatically energized by the slave microprocessor 34 when the pump on signal is generated. When a fuel delivery is completed, the pump control handle 40 is turned off. If the pump is to be used for a succeeding delivery before payment is made for the preceding delivery, the pump can be authorized and the succeeding transaction will be stored in the other RAM delivery register.

In the preset mode, after the preset amount is delivered and if payment for the preset amount was made prior to the delivery, the appropriate CASH or CREDIT push button is actuated to mark payment. If the full preset amount is not delivered, a refund and/or payment is made as appropriate, and the appropriate payment push button is actuated to mark payment. The original preset amount stored in the slave provides for automatically terminating the delivery, and only the actual volume and cost amounts dispensed are added to the totals stored in the slave and master microprocessors and only after the completion of a delivery and when a payment push button is actuated to mark payment.

In the manual or local control mode, although prior authorization at the central control station is not required and the pump is controlled by the pump handle, the cost and volume amounts of each delivery are added to the slave and master totals at the end of the delivery when the pump control handle 40 is turned off to provide complete cost and volume accountability of all deliveries.

The fuel delivery control and registration system has three primary levels of interfacing. These are between each dispenser 10 and its respective slave module 32, between the slave modules 32 and the master module 12, and between the master module 12 and the peripheral components or controllers (of which there are four shown) which can be provided for remotely controlling the fuel pumps 10 and/or remotely registering and identifying any or all of the information which can be displayed by the cost/volume register 22. Many different types of peripheral components may be employed. For example, the peripheral components may include as shown in FIG. 1, (a) a remote display console and keyboard module 70, for example, which functions like the display console 18 and keyboard 42; (b) a remote price setting controller 72 for remotely entering the established unit volume price for each available fuel product (and also, if desired, for setting the unit volume price at each fuel pump 10 as, for example, where the fuel pump 10 has an electronic computer of the type shown in U.S. Pat. No. 4,125,762 of Donald W. Fleischer, dated Nov. 14, 1978, and entitled "Rotary Electromagnetic Indicator System", in which case the price controller 72 would have suitable direct connection (not shown) with each fuel pump); (c) a printer 74 to provide customer receipts or other printouts of all or selected available fuel delivery data, etc. stored in the slave and master microprocessors; and (d) a suitable computer link 76 further connected, for example, via a telephone line to a remote computer 78 which is also similarly connected to a large number of similar gasoline station systems, for remote central station accounting purposes as desired.

Each slave microprocessor 34 is connected (to the respective dispenser 10) via a suitable signal converter 62 supplied with 115 VAC and 170 VDC power and a five wire electrical connector to the dispenser 10. When an authorization signal is supplied by the slave microprocessor 34, the signal converter 62 supplies 115 VAC power to the electric pump reset mechanism 58. If the pump control handle 40 is on or when it is thereafter turned on, the electric reset mechanism 58 is operated through a reset cycle to reset the pump register 56. Upon completion of the reset cycle, the reset mechanism 58 supplies 115 VAC as a pump on signal to the pump motor 60 and the low flow valve 50 to condition the pump for delivering fuel. Also, a 170 VDC on signal is thereupon supplied via an input multiplexor 64 to the slave microprocessor 34, which then supplies a high flow signal to supply 115 VAC to the high flow valve 52. In the preset mode the high flow valve 52 is automatically de-energized by the slave microprocessor 34 to close the high flow valve 52 and thereby slow down the rate of fuel delivery when the amount delivered equals the difference between the preset amount and the second stage constant stored in the slave RAM. Similarly, the 115 VAC authorization line to the pump 10 is de-energized when the amount delivered equals the preset amount, and the pump motor 60 and low flow valve 50 are thereby de-energized to terminate the fuel delivery. Also, the low flow valve 50 and the pump motor 60 are de-energized and the pump on line from the pump 10 is de-energized when the pump control handle 40 is turned off. The slave 34 thereupon automatically de-energizes the high flow valve 52. The pump 10 can be similarly deauthorized with the keyboard 24 during the delivery of fuel to temporarily discontinue a delivery in process.

During the delivery of fuel, a suitable rotary pulse generator 66 connected to the pump register cost counter 68 is rotated to generate a train of cost pulses with a pulse for each predetermined incremental cost amount of fuel delivered (e.g. a pulse for each one cent or one-tenth of a cent of fuel delivered). The cost pulses are transmitted as suitable logic pulse signals from the signal converter 62 and via the multiplexor 64 to the slave microprocessor 34 to accumulate the cost amount of the individual fuel delivery in the selected register of the slave RAM.

If the pump control handle 40 is turned on before the pump 10 is authorized the request/authorization wire to the pump is suitably connected to a "neutral" wire to the pump to supply a "neutral" request signal. A request logic signal is thereupon supplied by the signal converter 62 and via the slave input multiplexor 64 to the working memory of the slave microprocessor RAM and substantially immediately thereafter from the salve microprocessor 34 to the master and display microprocessors 14, 16 to be displayed by the display console.

When a pump is authorized, the authorization status is stored in the slave microprocessor RAM and the subsequent pump delivery can be made (in either a preset or a non-preset mode of operation) without any required further communication between the slave and master microprocessors 34, 14. The slave microprocessor 34 and the entire slave module 32 are dedicated entirely to controlling the respective pump and accumulating (in the A or B register of the slave RAM as previously established by the master microprocessor 14) the cost amount of the authorized fuel delivery.

The master module 12 communicates with the plurality of slave modules 32 via a common four bit slave input bus and a common four bit slave output bus. The slaves 32 are individually (sequentially but asynchronously) activated for communication with the master 12 in a handshaking transmission and response procedure. When a slave 32 is activated by a sequence signal (generated by the master 12 to effect communication between the master 12 and the first slave 32 in the sequence and generated by each slave 32 to effect communication between the succeeding slave 32 and the master 12), the slave 32 transmits its current pump status via the slave output bus to the master. Thus, only one slave 32 at a time is activated to transmit a message to the master 12 via the slave output bus or receive a message from the master 12 via the slave input bus. Also, the initial pump status message transmitted by each slave 32 to the master 12 includes a sequence bit for maintaining the master in synchronism with the slave sequence.

Upon receiving a status message from a slave 32, the master 12 responds by transmitting a reply message in hexadecimal format (which may merely acknowledge the slave status message or authorize or deauthorize the pump or may request data stored in the slave memory or advise the slave to store revised data forthcoming from the master) via the slave input bus to the active slave 32. As may be required, four bit messages in hexadecimal format are then successively transmitted by the master and slave (either immediately or during the following slave sequence cycle) in a handshaking transmission and response procedure to complete a communication. More particularly, the communication continues with an input bus message from the master followed by an output bus message from the slave. The master then drops its slave input bus signal and then the active slave then drops its slave output bus signal, and that four step cycle is repeated until the communication is completed.

After the completion of a communication between a slave 32 and the master 12, the slave 32 energizes its pump sequence control output to activate the next slave in the sequence. Upon the completion of a slave sequence cycle, the pump sequence control signals are de-energized in sequence by the master and slaves and a succeeding cycle is then initiated by the master 12. A communication between the master and a slave can be temporarily interrupted as necessary (after receipt of a slave status message) to free the master microprocessor 14 for communication with the display microprocessor 16 and/or the peripheral components.

In addition to the slave output bus, a peripheral output bus for the peripheral components or controllers 70, 72, 74, 76, and a display-to-master bus are connected to the master microprocessor 14 via an input multiplexor 80. A fourth four bit input connected to the master microprocessor 14 via the input multiplexor 80 includes (a) a run/stop line from the master keyboard switch; (b) a common peripheral interrupt request line from the peripheral components; (c) a MANAGER mode line from the keyboard key lock 28; and (d) a control line from an AND gate connected to the master and display microprocessors 14, 16 for preventing a communication lock otherwise possible in certain modes of operation of the system.

There are two types of outputs from the display microprocessor 16. Eight data outputs are used at different times to provide (a) LED indicator operating data for temporary storage in a storage latch 84; (b) 7-segment operating data for each digit of the identification and cost/volume registers 20, 22; and (c) display-to-master bus data for transmission via the master input multiplexor 80 to the master microprocessor 14. A second group of sixteen control outputs from the display microprocessor 16 are individually settable and resettable by the display microprocessor 16 to generate ten sequential timing signals T1–T10 for strobing (a) the keyboard push button switches (of which there are twenty-eight in the shown embodiment) for which purpose the push button switches are arranged in a four-by-ten matrix; (b) the eight digits of the identification and cost/volume registers 20, 22; and (c) the REQ/AUTH and COMPLETE indicators, the A and B UNPAID indicators and the decimal point indicators of the cost/volume register 22. Those indicators and the registers 20, 22 are thereby energized in accordance with the four line indicator control output of the storage latch 84, and the seven line segment control output and decimal point control output of the display microprocessor 16.

The remaining three control outputs of the display microprocessor 16 are employed for alternatively energizing the A and B SELECT indicators and the $ and VOL indicators and for selectively energizing the beeper 46.

The master microprocessor 14 has eight data outputs for providing slave input bus, peripheral input bus, and master-to-display bus data and eight control outputs for supplying control signals to the system. Likewise, each slave microprocessor has four data outputs for providing slave output bus data and four control outputs for supplying control signals to the system.

A four line keyboard output and the master-to-display data bus are connected via the input multiplexor 26 to the display microprocessor 16 for entering each keyboard push button signal and for receiving data from the master microprocessor 14. The master and display microprocessors communicate back and forth with each other via the master-to-display bus and display-to-master bus through an asynchronous handshaking procedure like that employed in communications between the master and slaves.

Data is transmitted (in hexadecimal format) between the peripheral controllers 70, 72, 74, 76 and the master module 12 via a common peripheral input bus and a common peripheral output bus. Each controller is selectively activated by a respective master interrupt control connecting the master 12 with the peripheral controller. Also, the four peripheral controllers are connected via an OR gate to provide a single common peripheral interrupt request input to the master. An interrupt is initiated by the master by transmitting an interrupt control signal to the selected peripheral and is initiated by a peripheral by transmitting an interrupt request signal to the master via the common peripheral interrupt request line. The peripherals are connected so that an interrupt request signal from one peripheral to the master or an interrupt control signal from the master to one peripheral will forestall communications with the remaining peripherals. Before the master initiates an interrupt, it supplies a peripheral identification signal to the peripheral input bus to identify the peripheral being signaled. A selected peripheral component will answer a master interrupt control signal by generating a peripheral interrupt request signal. When a peripheral interrupt request signal is received by the master from a peripheral, either in response to a master interrupt control signal or when an interrupt is initiated by the peripheral, the peripheral input bus is checked by the master to identify the peripheral. Where the interrupt is initiated by the master, the peripheral input bus signal will identify the peripheral. Where the interrupt is initiated by the peripheral, the master will then transmit interrupt control signals to the peripherals in sequence and the active peripheral is identified by dropping its interrupt request signal when it receives an interrupt control signal from the master. After peripheral identification is established, the active peripheral and master communicate in the same manner as the display microprocessor and master.

As will be apparent to persons skilled in the art, various modifications, adaptations and variations of the foregoing specific disclosure can be made without departing from the teachings of the present invention.

We claim:

1. In a fuel delivery control and registration system for retrofitting a plurality of separate independently operable fuel delivery dispensers, each independently settable to establish the unit volume price of fuel delivered therefrom and adapted to be independently activated for delivering fuel and registering the cost amount of fuel delivered in accordance with the unit volume price established by the dispenser, comprising a cost pulse generator for each dispenser connected to the dispenser for generating a cost pulse for each predetermined cost amount of fuel delivered thereby in accordance with the unit volume price established by the dispenser, register means operable for independently registering the cost amount of fuel delivered by each dispenser in accordance with the number of cost pulses generated by the corresponding cost pulse generator and control means comprising a keyboard having a plurality of manually operable switches and electronic computer means operatively connected to the register means, keyboard switches and each dispenser and corresponding cost pulse generator and selectively operable by selective manual operation of the keyboard switches to independently activate each dispenser for delivering fuel and to accumulate the cost amount of fuel delivered thereby and selectively operable by selective manual operation of the keyboard switches to operate the register means to independently register the accumulated cost amount of fuel delivered by each dispenser in accordance with the number of cost pulses generated by the corresponding cost pulse generator, the improvement wherein the electronic computer means comprises a master electronic computer module operatively connected to the register means and keyboard switches, a plurality of dedicated slave electronic computer modules operatively connected to the plurality of fuel dispensers and corresponding cost pulse generators respectively, and common slave communication bus means for the plurality of slave modules interconnecting the master module and each slave module for communications therebetween, each slave module being independently operable by selective manual operation of the keyboard switches and through communication between the master module and the slave module to activate the respective dispenser for delivering fuel and to accumulate the cost amount of fuel delivered thereby in accordance with the number of cost pulses generated by the corresponding cost pulse generator, the master module being selectively operable by selective manual operation of the keyboard switches to operate the register means to independently register the accumulated cost amount of fuel delivered by each dispenser and communicated to the master module from the respective slave module, the electronic computer means being operable to condition the plurality of separate dispensers to be independently activated for delivering fuel and for registering the cost amount of fuel delivered thereby independently of the electronic computer means and in accordance with the unit volume price established by the dispenser.

2. A fuel delivery control and registration system according to claim 1 wherein the master module is selectively operable by selective manual operation of the keyboard switches to enter a unit volume price of fuel into storage in the master module and to operate the register means to independently register the volume and cost amounts of fuel delivered by each dispenser in accordance with the accumulated cost amount of fuel communicated from the respective slave module to the master module and the unit volume price stored in the master module.

3. A fuel delivery control and registration system according to claim 2 wherein the plurality of fuel dispensers are operable for delivering a plurality of different fuel products having different unit volume prices, wherein the master module is selectively operable by selective manual operation of the keyboard switches to enter into storage in the master module a separate unit volume price for each of the plurality of different fuel products and operate the register means to independently register the volume and cost amounts of fuel delivered by each dispenser in accordance with the accumulated amount of fuel communicated to the master module from the respective slave module and the respective unit volume price stored in the master module.

4. A fuel delivery control and registration system according to claim 1 wherein each slave module is operable to separately accumulate the cost amount of each of a plurality of separate fuel deliveries by the respective dispenser and the master module is selectively operable by selective manual operation of the keyboard switches to operate the register means to independently register the accumulated cost amount of each separate fuel delivery by each dispenser and communicated to the master module by the respective slave module.

5. A fuel delivery control and registration system according to claim 1 wherein each slave module is operable for separately accumulating an individual delivery cost amount of fuel, a cumulative delivery cost amount of fuel and a cumulative delivery volume amount of fuel computed by the master module and communicated thereby to the slave module.

6. A fuel delivery control and registration system according to claim 1 wherein each slave module is selectively operable by selective manual operation of the keyboard switches and via communication with the master module to store therein a selected preset cost amount of fuel and to automatically deactivate the respective dispenser for delivering fuel after the preset cost amount of fuel is delivered.

7. A fuel delivery control and registration system according to claim 6 wherein each slave module is selectively operable by selective manual operation of the keyboard switches and via communication with the master module to selectively place the slave module in either a preset mode of operation, with automatic deactivation of the respective dispenser after a said preset cost amount of fuel is delivered, or a non-preset mode of operation without automatic deactivation of the respective dispenser.

8. A fuel delivery control and registration system according to claim 1 wherein the common slave bus means comprises a common slave input communication bus for transmitting messages from the master module to each slave module and a common slave output communication bus for transmitting messages to the master module from each slave module.

9. A fuel delivery control and registration system according to claim 8 further comprising sequence control means for sequentially activating the slave modules in a predetermined succession thereof and comprising a sequence control connection between the master module and the first slave module of the predetermined succession, and between each pair of successive slave modules and operable for sequentially activating the slave modules in succession with said control connections for individual communication with the master module via the slave input bus and slave output bus.

10. A fuel delivery control and registration system according to claim 1 wherein each slave module comprises a slave microprocessor operatively connected to the common slave bus means and wherein the master module comprises a master microprocessor operatively connected to the common slave bus means for communication between the master microprocessor and each slave microprocessor.

11. In a fuel delivery control and registration system for retrofitting a plurality of separate independently operable fuel delivery dispensers, each independently settable to establish the unit volume price of fuel delivered therefrom and adapted to be independently activated for delivering fuel and registering the cost amount of fuel delivered in accordance with the unit volume price established by the dispenser, comprising a cost pulse generator for each dispenser connected to the dispenser for generating a cost pulse for each predetermined cost amount of fuel delivered thereby in accordance with the unit volume price established by the dispenser, register means operable for independently registering the cost amount of fuel delivered by each dispenser in accordance with the number of cost pulses generated by the corresponding cost pulse generator and control means comprising a keyboard having a plurality of manually operable switches and electronic computer means operatively connected to the register means, keyboard switches and each dispenser and corresponding cost pulse generator and selectively operable by selective manual operation of the keyboard switches to independently activate each dispenser for delivering fuel and to accumulate the cost amount of fuel delivered thereby and selectively operable by selective manual operation of the keyboard switches to operate the register means to independently register the accumulated cost amount of fuel delivered by each dispenser in accordance with the number of cost pulses generated by the corresponding cost pulse generator, the improvement wherein the electronic computer means comprises a master electronic microprocessor module operatively connected to the register means and keyboard switches, and a plurality of dedicated slave electronic microprocessor modules operatively connected to the plurality of fuel dispensers and corresponding cost pulse generators respectively and to the master module for communications therebetween, each slave module being independently operable by selective manual operation of the keyboard switches and through communication between the master module and the slave module to activate the respective dispenser for delivering fuel and to accumulate the cost amount of fuel delivered thereby in accordance with the number of cost pulses generated by the corresponding cost pulse generator, the master module being selectively operable by selective manual operation of the keyboard switches to operate the register means to independently register the accumulated cost amount of fuel delivered by each dispenser and communicated to the master module from the respective slave module, the electronic computer means being operable to condition the plurality of separate dispeners to be independently activated for delivering fuel and for registering the cost amount of fuel delivered thereby independently of the electronic computer means and in accordance with the unit volume price established by the dispenser.

* * * * *